United States Patent
Yi et al.

(10) Patent No.: US 12,259,920 B1
(45) Date of Patent: Mar. 25, 2025

(54) DYNAMIC OPTIMIZATION OF KEY VALUE PAIR EXTRACTORS FOR DOCUMENT DATA EXTRACTION

(71) Applicant: International Business Machines Corporation, Armonk, NY (US)

(72) Inventors: Ang Yi, Beijing (CN); Jing Zhang, Beijing (CN); Hai Cheng Wang, Beijing (CN); Jun Hong Zhao, Beijing (CN); Yang Zhong Li, Beijing (CN); Rajesh M. Desai, San Jose, CA (US); Xue Lan Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/462,765

(22) Filed: Sep. 7, 2023

(51) Int. Cl.
G06F 16/383 (2019.01)
G06F 16/31 (2019.01)

(52) U.S. Cl.
CPC .......... *G06F 16/383* (2019.01); *G06F 16/316* (2019.01)

(58) Field of Classification Search
CPC ....... G06F 16/383; G06F 16/316; G06F 16/38
See application file for complete search history.

(56) References Cited

U.S. PATENT DOCUMENTS

| | | | |
|---|---|---|---|
| 9,292,579 B2 | 3/2016 | Madhani et al. | |
| 10,853,638 B2 | 12/2020 | Mukhopadhyay et al. | |
| 10,896,357 B1 | 1/2021 | Corcoran et al. | |
| 2015/0127659 A1 | 5/2015 | Madhani et al. | |
| 2018/0113920 A1* | 4/2018 | Klein | G06F 16/258 |
| 2018/0114060 A1* | 4/2018 | Lozano | G06Q 10/10 |
| 2018/0232204 A1* | 8/2018 | Ghatage | G06F 7/02 |
| 2019/0205636 A1* | 7/2019 | Saraswat | G06V 30/412 |
| 2020/0074169 A1 | 3/2020 | Mukhopadhyay et al. | |
| 2020/0279017 A1* | 9/2020 | Norton | G06N 3/045 |
| 2021/0166074 A1 | 6/2021 | Tecuci et al. | |
| 2021/0350252 A1* | 11/2021 | Alexander | G06N 20/00 |
| 2022/0207268 A1* | 6/2022 | Gligan | G06F 40/137 |
| 2022/0351088 A1* | 11/2022 | Kumar | G06N 7/01 |

FOREIGN PATENT DOCUMENTS

CN 110889310 B 5/2023

OTHER PUBLICATIONS

Daniel Akinbade et al., "An Adaptive Thresholding Algorithm-Based Optical Character Recognition System for Information Extraction in Complex Images", Journal of Computer Science 2020, pp. 784-801.

(Continued)

*Primary Examiner* — Kris E Mackes
(74) *Attorney, Agent, or Firm* — Andre L. Adkins

(57) ABSTRACT

Disclosed embodiments provide techniques for monitoring and evaluating the effectiveness of key value pairs (KVPs) used in a document processing system. In embodiments, KVPs are obtained from multiple extractors of a document processing system. A score is computed for the KVPs by computing an effectiveness metric for each KVP from the multiple KVPs. In response to the computed score being below a predetermined threshold, a model retraining process is performed to generate a new set of KVP extractors, and provide the new set of KVPs to the document processing system.

20 Claims, 8 Drawing Sheets

(56) References Cited

OTHER PUBLICATIONS

Suzan Verberne et al., "Evaluation and analysis of term scoring methods for term extraction", Information Retrieval Journal, 2016, pp. 510-545.

Henning Wachsmuth et al., "Learning Efficient Information Extraction on Heterogeneous Texts", International Joint Conference on Natural Language Processing, Oct. 2013, pp. 534-542.

* cited by examiner

300

302

| DATE: August, 01, 20XX | BILL OF LADING | |
|---|---|---|
| SENDER: | KWIKCHEM<br>123 Main St<br>Yourtown, NY, 12345 | BILL OF LADING NUMBER: |
| RECIPIENT: | ZAPPYCO<br>321 Park Blvd<br>Mytown, NY, 13452 | CARRIER NAME:<br><br>FREIGHT TERMS |
| SPECIAL INSTRUCTIONS 304<br><br>Must ship no later than August, 08, 20XX | | |

| ORDER NUMBER | QTY | WGT | | |
|---|---|---|---|---|
| 123ABCQ55 | 9 | 77KG | | |

| Unit QTY | Package QTY | WGT | DESCRIPTION | |
|---|---|---|---|---|
| 3 | 9 | 77KG | Copper Chloride | |

| | GRAND TOTAL $4077.23 |
|---|---|

| SHIPPER SIGNATURE DATE | | CARRIER SIGNATURE DATE |
|---|---|---|
| August, 03, 20XX | | August, 04, 20XX |

DYNAMIC OPTIMIZATION OF KEY VALUE PAIR EXTRACTORS FOR DOCUMENT DATA EXTRACTION

FIELD

The present invention relates generally to automatic document analysis and processing, and more particularly, to computer systems for dynamically optimizing a set of key value pair extractors used to perform document data extraction.

BACKGROUND

Automated document processing plays a key role in modern organizations for a variety of reasons. It provides numerous benefits to businesses in terms of efficiency, accuracy, compliance, and cost savings. Automated document processing significantly speeds up routine tasks such as data entry, information extraction, sorting, and filing. This efficiency gain leads to faster decision-making, improved productivity, and reduced turnaround times, which is essential in today's fast-paced business environment. Manual data entry and processing can be prone to errors, which could lead to serious consequences in business operations.

Automated document processing provides a consistent approach to handling documents, regardless of the volume. This consistency is particularly important for maintaining data integrity and complying with industry regulations. Furthermore, as operations such as businesses, education, or government operations grow, the volume of documents also increases. Automated systems can enable handling of larger workloads without requiring a proportional increase in human resources. Additionally, automated document processing systems can result in cost savings by reducing the need for manual labor and minimizing error-related expenses. Thus, automated document processing is an important component of modern business applications, enabling organizations to streamline operations, reduce errors, improve efficiency, ensure compliance, and allocate human resources more strategically, ultimately leading to enhanced competitiveness and growth.

SUMMARY

In one embodiment, there is provided a computer-implemented method for document processing, comprising: obtaining a plurality of key value pairs (KVPs) from a plurality of KVP extractors of a document processing system; computing a score for the plurality of KVPs by computing an effectiveness metric for each KVP from the plurality of KVPs; in response to the computed score being below a predetermined threshold, performing a model retraining process to generate a new set of KVP extractors; and providing the new set of KVP extractors to the document processing system.

In another embodiment, there is an electronic computation device comprising: a processor; a memory coupled to the processor, the memory containing instructions, that when executed by the processor, cause the electronic computation device to: obtain a plurality of key value pairs (KVPs) from a plurality of KVP extractors of a document processing system; compute a score for the plurality of KVPs by computing an effectiveness metric for each KVP from the plurality of KVPs; in response to the computed score being below a predetermined threshold, perform a model retraining process to generate a new set of KVP extractors; and provide the new set of KVP extractors to the document processing system.

In yet another embodiment, there is provided a computer program product for an electronic computation device comprising a computer readable storage medium having program instructions embodied therewith, the program instructions executable by a processor to cause the electronic computation device to: obtain a plurality of key value pairs (KVPs) from a plurality of KVP extractors of a document processing system; compute a score for the plurality of KVPs by computing an effectiveness metric for each KVP from the plurality of KVPs; in response to the computed score being below a predetermined threshold, perform a model retraining process to generate a new set of KVP extractors; and provide the new set of KVP extractors to the document processing system.

BRIEF DESCRIPTION OF THE DRAWINGS

FIG. 3 is an exemplary document that can be processed with disclosed embodiments.

Figure 1:
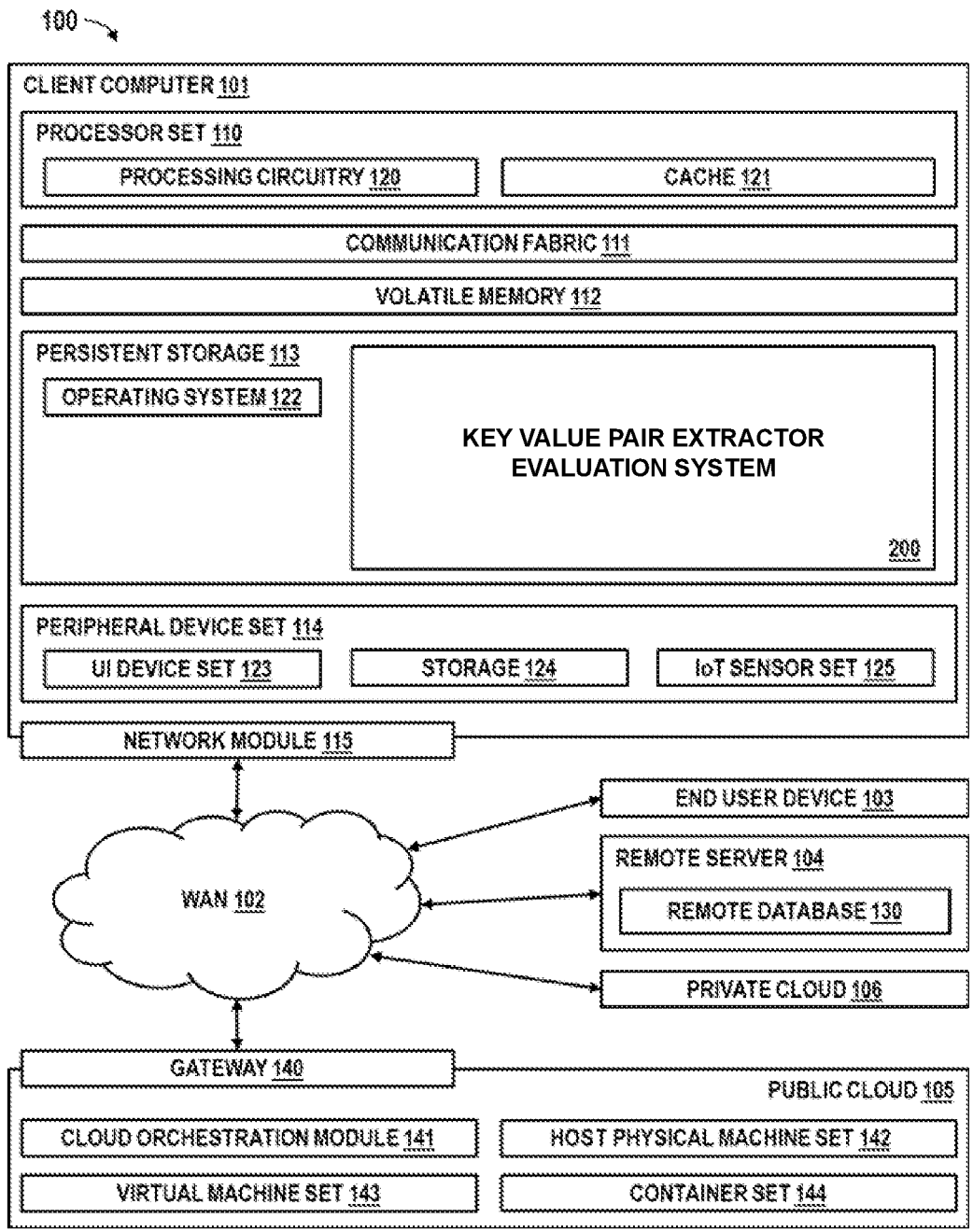
FIG. 1 is an exemplary computing environment in accordance with disclosed embodiments.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Automated document processing systems often utilize key value pairs as part of the document analyzing process. Key value pairs (KVPs) are an important concept in information processing, particularly in databases, data structures, programming, and various information systems. KVPs enable storing of diverse types of data together without rigid schema requirements. This flexibility is particularly useful when dealing with datasets that have varying attributes or when the data structure evolves over time, such as documents. KVPs facilitate quick retrieval of specific pieces of information using their associated keys. This efficient lookup time is especially valuable in applications where speed is essential, such as systems that ingest and process high volumes of documents. In document processing systems, extractors are functions and/or processes that can extract important KVPs such as names, dates, values, and/or other important information from documents.

Documents that serve similar purposes, such as forms, letters, and/or other business documents can have layouts that vary. This can create a challenge for document processing systems, as different extractors may have different levels of efficacy for different document layouts. Disclosed embodiments provide techniques for monitoring and evaluating the effectiveness of KVPs used in a document processing system. In embodiments, multiple key value pairs (KVPs) are obtained from multiple extractors of a document processing system. A score is computed for the KVPs by computing an effectiveness metric for each KVP from the multiple KVPs. In response to the computed score being below a predetermined threshold, a model retraining process is performed to generate a new set of KVP extractors, and provide the new set of KVP extractors to the document processing system.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 shows an exemplary computing environment 100 in accordance with disclosed embodiments. Computing environment 100 contains an example of an environment for the execution of at least some of the computer code involved in performing the inventive methods, such as key value pair extractor evaluation system block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
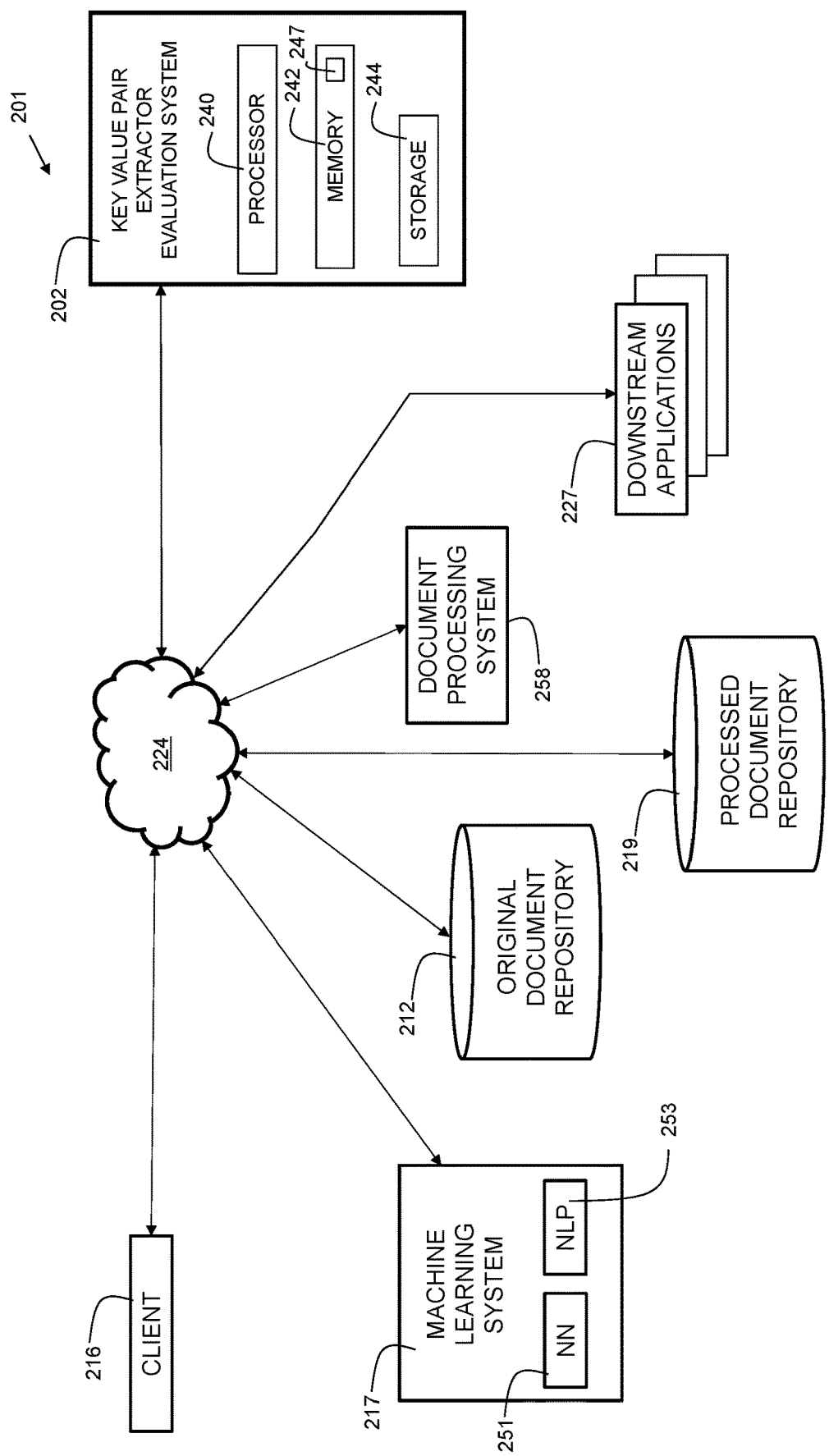
FIG. 2 is an exemplary ecosystem in accordance with disclosed embodiments.

FIG. 2 is an exemplary ecosystem 201 in accordance with disclosed embodiments. Key Value Pair Extractor Evaluation System (KVPEES) 202 comprises a processor 240, a memory 242 coupled to the processor 240, and storage 244. KVPEES 202 is an electronic computation device. The memory 242 contains program instructions 247, that when executed by the processor 240, perform processes, techniques, and implementations of disclosed embodiments. Memory 242 can include dynamic random-access memory (DRAM), static random-access memory (SRAM), magnetic storage, and/or a read only memory such as flash, EEPROM, optical storage, or other suitable memory, and should not be construed as being a transitory signal per se. In some embodiments, storage 244 may include one or more magnetic storage devices such as hard disk drives (HDDs). Storage 244 may additionally include one or more solid state drives (SSDs). The KVPEES 202 is configured to interact with other elements of ecosystem 201. KVPEES 202 is connected to network 224, which is the Internet, a wide area network, a local area network, or other suitable network.

Ecosystem 201 may include one or more client devices, indicated as 216. Client device 216 can include a laptop computer, desktop computer, tablet computer, or other suitable computing device. Client device 216 may be used to interact with KVPEES 202 to enable end-users to control operation of the KVPEES 202. Additionally, client device 216 may be used to configure features in the KVPEES 202, including features such as providing user input to a documentation processing system in terms of editing, selecting, and/or creating KVP extractors and/or editing a collection of KVPs extracted from one or more documents.

Ecosystem 201 may include an original document repository 212. The original document repository may include one or more databases, files, and/or other data structures stored on a medium such as one or more hard disks, cloud storage devices, and/or other suitable storage devices. In some embodiments, the original documents range in size from 10 pages to 5,000 pages. In some embodiments, the original documents may have more or fewer pages than that.

Ecosystem 201 may include a processed document repository 219. The processed document repository may include one or more databases, files, and/or other data structures stored on a medium such as one or more hard disks, cloud storage devices, and/or other suitable storage devices. In embodiments, the processed document repository 219 may include documents that have undergone an optical character recognition (OCR) process, in order to enable text-searchable document processing. In some embodiments, the processed document repository includes files that have one or more fields identified based on Cartesian coordinates within the document, identified entities, and/or other techniques.

Ecosystem 201 may include machine learning system 217. The machine learning system 217 can include a neural network (NN) 251, and/or a natural language processing (NLP) module 253. In some embodiments, the machine learning system 217 may include a Support Vector Machine (SVM), Decision Tree, Recurrent Neural Network (RNN), Long Short Term Memory Network (LSTM), Radial Basis Function Network (RBFN), Multilayer Perceptron (MLP), and/or other suitable neural network type. In embodiments, the machine learning system 217 is trained using supervised learning techniques.

The NLP module 253 may include software and/or hardware for performing Natural Language Processing (NLP). NLP is a subfield of artificial intelligence that involves teaching computers to understand, interpret, and/or generate human language. NLP works by breaking down human language into its constituent parts and analyzing them using various algorithms and techniques. In one or more embodiments, the NLP process includes tokenization, which can include breaking down a piece of text into individual words or phrases. The NLP process can further include Part-of-speech (POS) tagging. POS tagging can include analyzing each token and assigning it a part of speech, such as noun, verb, adjective, or adverb. The NLP process can further include parsing, which involves analyzing the syntactic structure of a sentence to identify the relationships between the words and phrases. The process can include entity detection, which involves identifying and categorizing named entities in a piece of text, such as people, places, organizations, and dates. In one or more embodiments, the NLP process may be used on business documents and/or legal documents to identify KVPs, and acquire metadata associated with the KVPs, such as a page number and/or a location of the KVP within the page and/or document.

Ecosystem 201 can include one or more downstream applications 227. The downstream applications can include an indexer, a tokenizer, a part of speech (POS) analyzer, a named entity recognition (NER) process, a text classifier, a language detector, a summarization process, and/or other suitable applications. In embodiments, the downstream applications 227 can take as input, documents from the original document repository 212 and/or the processed document repository 219. In some embodiments, the downstream applications 227 may utilize input from the original document repository 212 as part of a training process. Then, after the system is trained, during a runtime operation, the downstream applications 227 may utilize input from the processed document repository 219, in order to efficiently process document information by utilizing extracted information based on one or more KVP extractors.

Ecosystem 201 may include a document processing system 258. Document processing system 258 can include various components that work together to handle documents efficiently, accurately, and securely. The document processing system 258 can interface with document scanners that convert physical documents into digital images or text using technologies like OCR (Optical Character Recognition) techniques, as well as ICR (Intelligent Character Recognition), which is similar to OCR, but tailored for recognizing handwritten characters. The document processing system may further utilize NLP (Natural Language Processing) and/or other machine learning models to analyze and extract information from unstructured text, allowing for semantic understanding and context-based extraction. Additional functions of the document processing system 258 and/or downstream applications 227 can include, but are not limited to, data validation and verification, document versioning and tracking, and/or document storage and retrieval. The document processing system 258 can interface with KVPEES 202 in order to receive real-time adjustments to KVP extractors and/or other modeling data, to enable the document processing system 258 to provide effective results as various different types and/or formats of documents are input to the document processing system 258.

FIG. 3 is an exemplary document 300 that can be processed with disclosed embodiments. Document 300 is a bill of lading, which is an important document in international and domestic trade, providing a concise record of the shipment terms, conditions, and status while serving as a baseline for various logistical and legal aspects of the transportation process. Document 300 is one of many types of documents that disclosed embodiments may process. Other document types, can include, but are not limited to, purchase agreements, service contracts, leases, non-disclosure agreements (NDAs), employment contracts, loan agreements, financial statements, and so on.

Document 300 includes four different dates, indicated as 302, 304, 306, and 308. A common challenge with automated document processing pertains to which data is important, and which data should be ignored. With specific regards to document 300, different extractors may extract different dates. As an example, a first KVP extractor, extractor_1, may extract dates 302, 304, and 308, while a second KVP extractor, extractor_2, may extract dates 304, 306, and 308. Depending on which date(s) are important for a given business application, extractor_2 may be more well-suited for the business application than extractor_1. An end-user of the document processing system may need to edit an extractor to process a given document. In disclosed embodiments, user modifications to extractors are recorded. If the number of modifications to extractors exceeds a predetermined threshold, extractor retraining and/or selection of new models is performed by the KVPEES 202 and provided to the document processing system 258, in order to enable continuous effective document processing.

Figure 4:
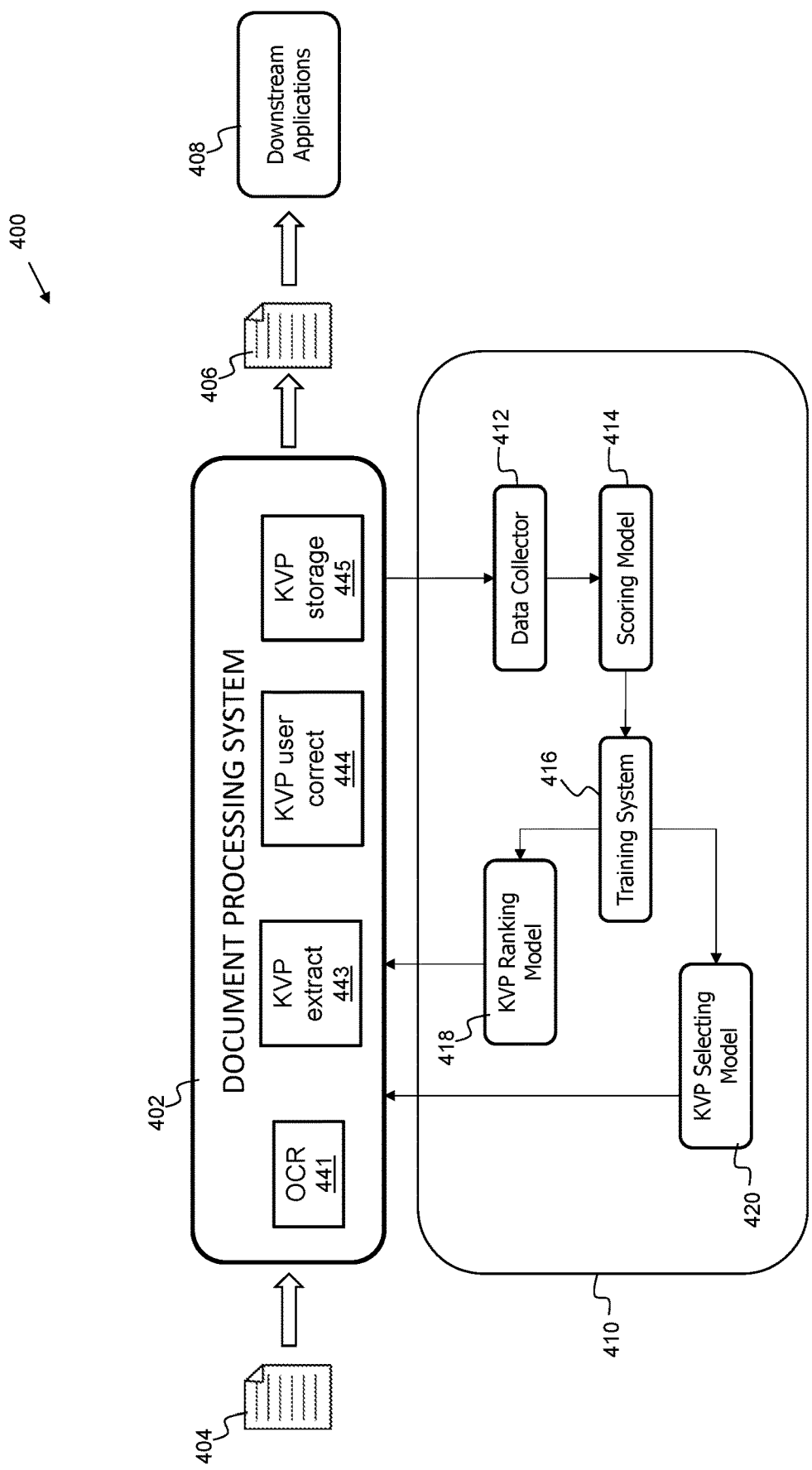
FIG. 4 is a block diagram illustrating components of disclosed embodiments.

FIG. 4 is a block diagram 400 illustrating components of disclosed embodiments. Diagram 400 includes document processing system 402. Document processing system 402 may be functionally equivalent to document processing system 258 of FIG. 2. The document processing system 402 can provide functions including, but not limited to, optical character recognition 441, KVP extraction 443, KVP user correction input 444, and/or KVP storage 445.

The KVP extraction 443 can be performed using a variety of techniques, including, but not limited to, regular expressions (regex), bounding box (BBox), and/or alias matching. In the processing of documents, embodiments can use bounding boxes to delineate the areas where user-provided information is expected to be. This can help in the accurate extraction of data from specific fields within the document. Additionally, embodiments can utilize alias matching to accommodate the presence of different variations of the same entity (such as a person, organization, or location) that might be referred to by different names, spellings, abbreviations, or other forms of aliases. In embodiments, the alias mapping can include creating a reference system that connects different aliases to a single entity. Embodiments may utilize databases, lookup tables, or algorithms that can recognize patterns and similarities. Disclosed embodiments may further utilize one or more fuzzy matching algorithms that can account for minor differences, such as spelling variations or small typographical errors, to establish connections between aliases and entities. The regex can include patterns used to match, search, and manipulate strings of text. The patterns can include character classes that enable matching of specific sets of characters. For example, [0-9] matches any digit, and \w matches any word character. Other KVP extraction techniques are possible in disclosed embodiments.

Diagram 400 includes Key Value Pair Extractor Evaluation System (KVPEES) 410. In embodiments, KVPEES 410 may be functionally similar to KVPEES 202 of FIG. 2. In some embodiments, KVPEES 410 may be distributed over one or more networked computing devices, virtual machines, and/or containerized applications. KVPEES 410 includes data collector 412. Data collector 412 can include functions and instructions for updating statistical metrics based on the processing of input documents 404. The data collector 412 can include and/or utilize a variety of techniques, including KVP information, such as confidence levels, text orientation, value validation, and so on. Disclosed embodiments may also utilize a predicted key class, which is a key value pair class as predicted by a pre-trained extraction module, as well as a target key class, which is a key value pair class that is annotated by an administrator and/or end-user of a document processing system.

Document processing system 402 receives input documents 404, which may be obtained from an original document repository, such as 212 of FIG. 2, processed, resulting in processed documents 406, which may be stored in a processed document repository, such as 219 of FIG. 2. The processed documents 406 may be input to one or more downstream applications 408. Downstream applications 408 may be similar to downstream applications 227 of FIG. 2.

The output of the data collector 412 is input to scoring module 414. The scoring module 414 can score one or more KVP extractors based on accuracy, amount of user intervention applied, and/or other criteria. If the scoring of KVP extractors is below a predetermined threshold, the scoring module 414 activates training system 416, which performs a retraining process by evaluating multiple KVP extractors and/or combinations of KVP extractors via KVP selecting model 420 and/or KVP ranking model 418. In embodiments, the top-ranked extractors are provided back to document processing system 402 to enable dynamic real-time adjustments that adapt to the characteristics of input documents 404. Embodiments can include providing a KVP ranking model to the document processing system.

Figure 5:
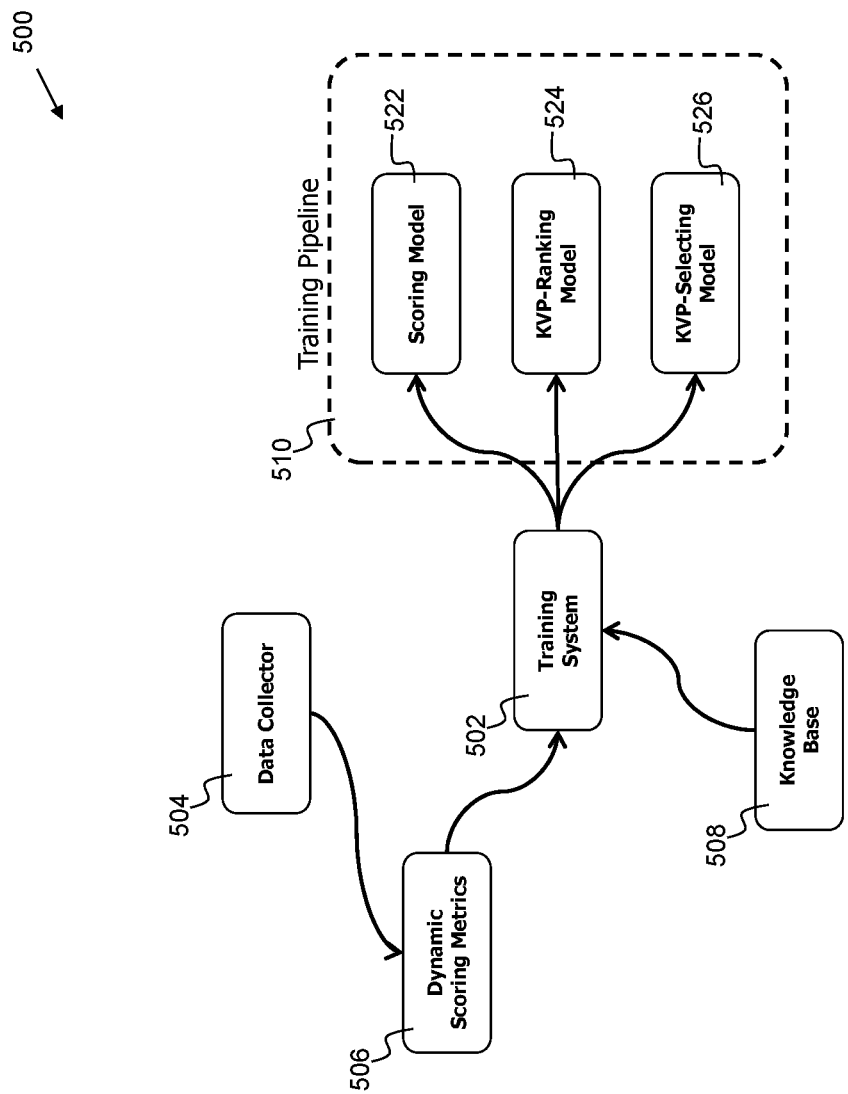
FIG. 5 is a block diagram showing details of a training system in accordance with disclosed embodiments.

FIG. 5 is a block diagram 500 showing details of a training system in accordance with disclosed embodiments. A training system 502 receives input from a data collector 504. Data collector 504 may be functionally similar to data collector 412 of FIG. 4. The data collector updates dynamic scoring metrics 506 in real-time as documents are processed. A knowledge base 508 may provide additional heuristics regarding input documents. The training system 502 evaluates the input information, and based on metrics such as confidence scores, amount of user intervention in KVP extraction, and/or other parameters, initiates training pipeline 510. Training pipeline 510 can include a scoring model 522, KVP ranking model 524, and/or KVP selecting model 526. The KVP selecting model 526 and/or KVP ranking model 524 can evaluate one or more KVP extractors and/or combinations of KVP extractors.

Figure 6:
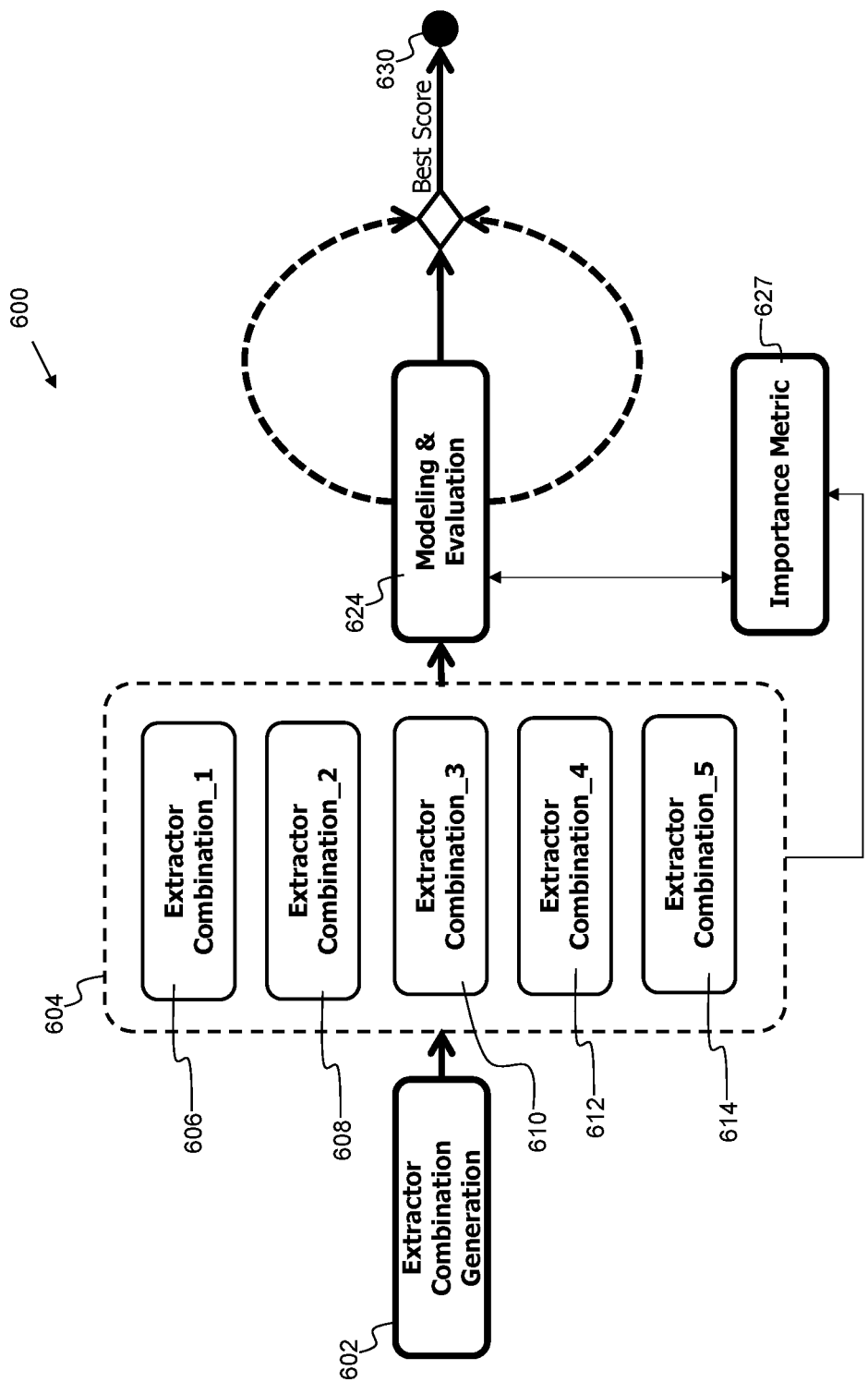
FIG. 6 is a block diagram illustrating extractor combination generation in accordance with disclosed embodiments.

FIG. 6 is a block diagram 600 illustrating extractor combination generation in accordance with disclosed embodiments. An extractor combination generation process 602 creates an extractor combination set (ECS) 604. The ECS 604 includes a list of one or more combinations of extractors. Extractors may be combined in series, where the output of a first extractor is input to a second extractor, or may be merged together using other techniques. In some embodiments, more than two extractors may be included in a combination. As an example, some embodiments may include extractor combinations that are a combination of three extractors. In the example of FIG. 6, there are five extractor combinations, indicated as 606, 608, 610, 612, and 614. In practice, there can be more or fewer extractor combinations. For each extractor combination, modeling and evaluation component 624 creates an importance metric 627. The importance metric 627 is used as a criterion for determining which extractor combination in ECS 604 is best-suited for providing to the document processing system for continued processing of incoming documents, by selecting the extractor combination having the best score 630.

Embodiments can include generating a plurality of extractor combinations; and ranking each extractor combination of the plurality of extractor combinations based on an importance metric. In embodiments, the importance metric is computed using at least one of, a confusion matrix, F1 score, Receiver Operator Characteristic curve, and precision-recall curve. A confusion matrix can be used to evaluate the performance of the KVP extraction by categorizing the performance into confusion matrix (CM) metrics that include true positives (TP), false positives (FP), true negatives (TN), and false negatives (FN). In one or more embodiments, a user-provided ranking is used in conjunction with the confusion matrix, in which the user-provided ranking prioritizes the importance of each CM metric. For example, in some usage scenarios, a false positive is the most detrimental, whereas in other usage scenarios, a false positive is less detrimental than a false negative. Disclosed embodiments can incorporate the user-provided CM metrics ranking in the evaluation of extractor combinations.

Some embodiments may utilize an F1 score in computation of an importance metric. In one or more embodiments, the F1 score may be used to assess the balance between precision and recall of a KVP extractor, enabling a measurement of KVP extractor accuracy by capturing both positive and negative instances, particularly, as described previously, in situations where the cost of false positives and false negatives is different. The F1 score can represent a harmonic mean of precision and recall, and in embodiments, has a value that ranges from 0 to 1, where a higher value indicates better KVP extractor performance.

In embodiments, the precision is the ratio of true positive predictions to the total predicted positives. Thus, the precision is an indication of the accuracy of positive predictions, indicating how many of the positive predictions were correct. High precision is an indication that when the model (KVP extractor) predicts positive, the model is usually correct. In embodiments, the recall represents the ratio of true positive predictions to the total actual positives. Thus, the recall provides an indication of how well the model identifies actual positives. High recall indicates that the model is good at finding most of the positive instances. Thus, in embodiments, the F1 score helps in assessing the overall performance of a KVP extractor combination by considering both precision and recall, enabling identification of a KVP extractor combination that best encompasses the features of correctly identifying positive instances while also minimizing incorrect positive predictions.

Some embodiments may utilize a Receiver Operating Characteristic (ROC) curve to represent the performance of an extractor combination by indicating the relationship between the true positive rate (sensitivity) and the false positive rate (1-specificity) as parameters for predicting the positive class are varied. The True Positive Rate (sensitivity) represents a ratio of correctly predicted positive instances (true positives) to the total actual positive instances, while the False Positive Rate represents a ratio of incorrectly predicted positive instances (false positives) to the total actual negative instances. Thus, in embodiments, the ROC curve score helps in assessing the overall performance of an extractor combination by considering both precision and recall, enabling identification of a KVP extractor combination that best encompasses the features of correctly identifying positive instances while also minimizing incorrect positive predictions.

Figure 7:
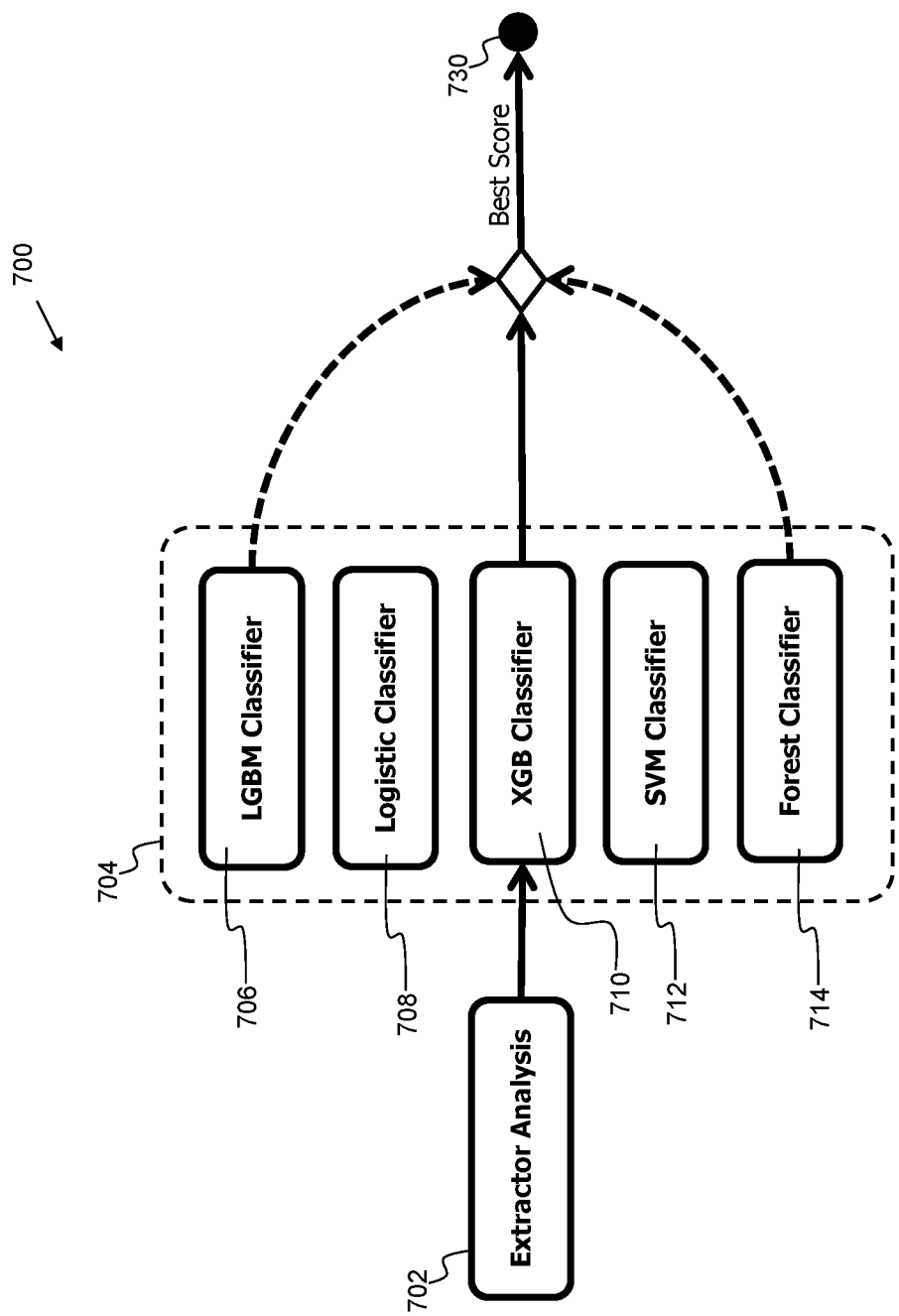
FIG. 7 is a block diagram illustrating extractor analysis in accordance with disclosed embodiments.

FIG. 7 is a block diagram 700 illustrating extractor analysis in accordance with disclosed embodiments. The output of the extractor analysis depicted in FIG. 6 is shown as 702 in FIG. 7, and is input to a classifier pool 704. Classifier pool 704 can include one or more classifiers. Block diagram 700 shows five classifiers in classifier pool 704, which include LightGBM classifier 706, Logistic Classifier 708, XGB classifier 710, SVM classifier 712, and Forest Classifier 714. Other embodiments may include more, fewer, and/or different classifiers within classifier pool 704.

Embodiments can include performing an extractor analysis, based on the effectiveness metrics. In embodiments, the extractor analysis utilizes at least one of a Forest Classifier, Support Vector Machine (SVM) classifier, logistic classifier, and gradient boost classifier. In embodiments, the gradient boost classifier includes at least one of XGB (Extreme Gradient Boosting) classifier, and LightGBM (Light Gradient Boosting Machine) classifier.

The LightGBM classifier and XGB classifier utilize gradient boosting techniques, which can be used to build predictive models for KVP extractor performance. The gradient boosting techniques enabling creating of an ensemble of models, where subsequently added models provide corrections to previous models, serving to promote minimization of prediction errors. Embodiments can include initialization by training a first model on the data, and computing residuals, which are the difference between the actual target values and the predictions of the initial model. These residuals represent the errors of the initial model. A new model is trained to predict the residuals from the previous iteration. This model is designed to correct the errors of the initial model. As new documents are processed using one or more KVP extractors, the predictions of the new model are added to the predictions of the initial model. The combined predictions are continuously evaluated to determine if they are approaching actual target values. This process can continue for multiple iterations or continuously, as documents are processed, to continue evaluation and updating of KVP extractors and/or KVP extractor combinations.

The forest classifier, sometimes referred to as a random forest classifier, injects randomness by utilizing a random subset of KVP extractor features during creation of decision trees, where the decision trees are grown to a maximum depth without pruning. In this way, the forest classifier can be used for providing a measure of feature importance for KVP extractors.

In embodiments, an SVM classifier is used to find a hyperplane that best separates the data points of different KVP extractors and/or KVP extractor combinations while maximizing the distance between the hyperplane and the nearest data points of each extractor/combination. The collection of nearest data points are the support vectors, which are then utilized for creation of a decision boundary to determine which KVP extractor and/or KVP extractor combination is best-suited for a particular document type. Some embodiments may use one or more of the classifiers in the classifier pool 704 for determining a best score 730.

Figure 8:
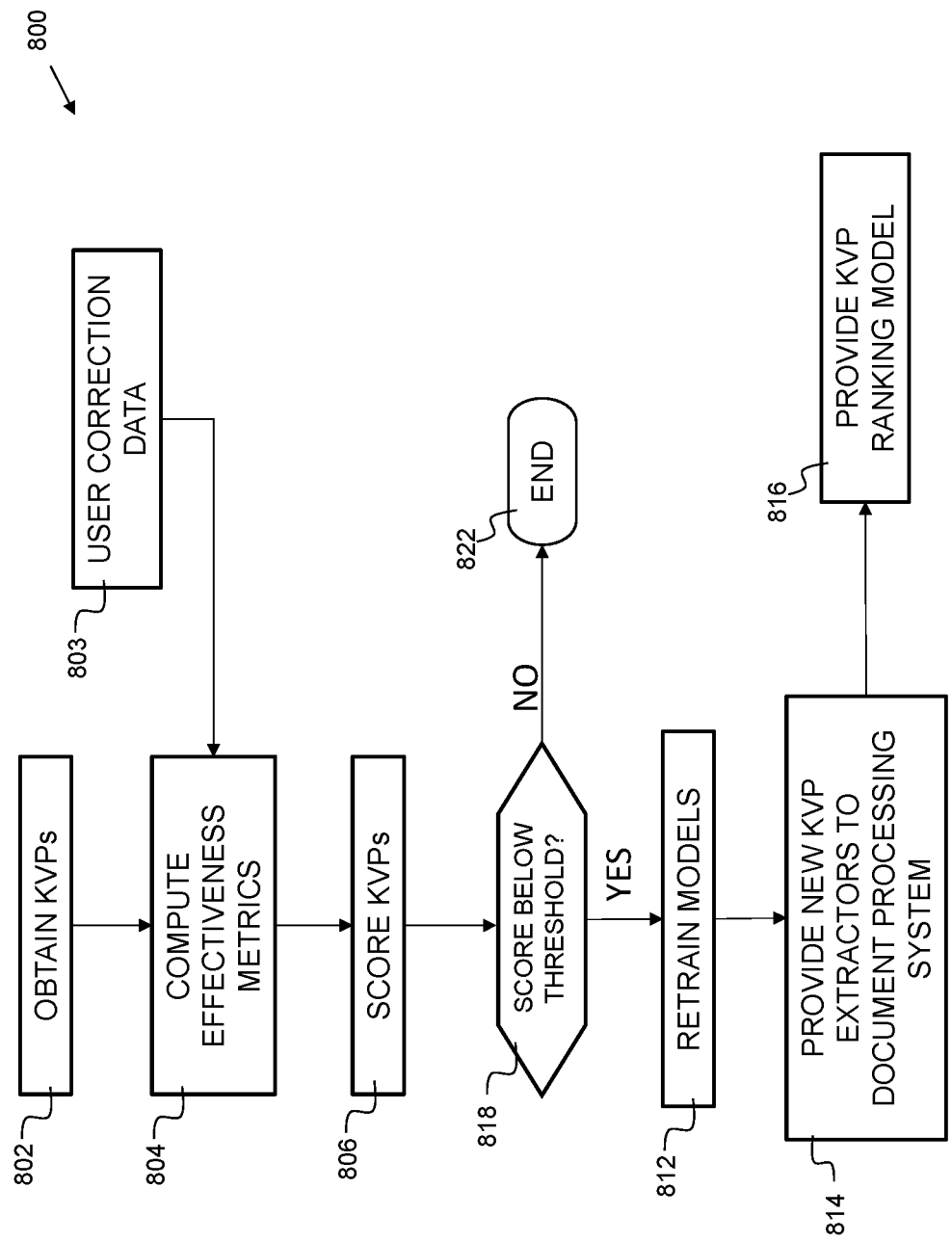
FIG. 8 is a flowchart indicating process steps for embodiments of the present invention.

FIG. 8 is a flowchart 800 indicating process steps for embodiments of the present invention. At block 802, a plurality of KVPs are obtained from a document processing system. The KVPs can include names, dates, addresses, quantities, weights, costs, and/or other important information. At block 803, user correction data is obtained. The user correction data can include indication of a field that a KVP extractor missed, and/or indication of a user-deleted field that a KVP extractor found, but was deemed to be unimportant for a given application. At block 804, an effectiveness metric is computed. In embodiments, the effectiveness metric can include a score that ranges from a minimum value (e.g., zero) to a maximum value (e.g., 100), where a higher score indicates a better-performing KVP extractor. In embodiments, the effectiveness metrics are based on a level of user correction applied to the plurality of KVPs. The process continues to block 806, where the collection of KVPs is evaluated together, to create an aggregate score for the collection of KVPs. At block 818, a check is made to determine if the score is below a predetermined threshold. In one or more embodiments, the predetermined threshold may be user-defined, provided via a client device such as client device 216 of FIG. 2. If, at block 818, the score is not below the threshold, then the process ends at block 822. If, at block 818, the score is below the predetermined threshold, then the process continues to block 812, where the models for KVP extraction are retrained using the techniques outlined and depicted in FIG. 6 and FIG. 7 and the corresponding description thereof. The process continues to block 814, where new KVP extractors are provided to the document processing system. At block 816, a KVP ranking model is also provided to the document processing system. The ranking model enables the document processing system to prioritize which KVPs to use when processing input documents.

As can now be appreciated, disclosed embodiments provide adaptive algorithms for evaluation and prediction of optimal extractors of KVPs for document sets and facilitates the development of an optimized model based on the selected ranking algorithm for field-level extraction. Thus, disclosed embodiments serve to enable improvements in KVP field extraction from documents, as well as improving the efficacy of automated document processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimized document processing, comprising:
 obtaining a plurality of key value pairs (KVPs) from a plurality of KVP extractors of a document processing system;

computing a score for the plurality of KVPs by computing an effectiveness metric for each KVP from the plurality of KVPs;

wherein the effectiveness metric factors an importance metric associated with the document processing system;

in response to the computed score being below a predetermined threshold, performing a model retraining process to generate a new set of KVP extractors;

providing the new set of KVP extractors to the document processing system; and dynamically adjusting the effectiveness metric based on the retraining via the document processing system.

2. The method of claim 1, wherein the effectiveness metrics are based on a level of user correction applied to the plurality of KVPs.

3. The method of claim 1, further comprising performing an extractor analysis, based on the effectiveness metrics.

4. The method of claim 3, wherein the extractor analysis utilizes at least one classifier selected from the group consisting of: Forest Classifier, Support Vector Machine (SVM) classifier, logistic classifier, and gradient boost classifier.

5. The method of claim 4, wherein the gradient boost classifier includes at least one classifier selected from the group consisting of XGB classifier, and LightGBM classifier.

6. The method of claim 1, wherein the model retraining process includes:

generating a plurality of extractor combinations; and ranking each extractor combination of the plurality of extractor combinations based on the importance metric.

7. The method of claim 6, wherein the importance metric is computed using at least one function selected from the group consisting of: confusion matrix, F1 score, Receiver Operator Characteristic curve, and precision-recall curve.

8. The method of claim 1, further comprising providing a KVP ranking model to the document processing system.

9. An electronic computation device comprising:

a processor;

a memory coupled to the processor, the memory containing instructions, that when executed by the processor, cause the electronic computation device to:

obtain a plurality of key value pairs (KVPs) from a plurality of KVP extractors of a document processing system;

compute a score for the plurality of KVPs by computing an effectiveness metric for each KVP from the plurality of KVPs;

wherein the effectiveness metric factors an importance metric associated with the document processing system;

in response to the computed score being below a predetermined threshold, perform a model retraining process to generate a new set of KVP extractors;

provide the new set of KVP extractors to the document processing system; and dynamically adjusting the effectiveness metric based on the retraining via the document processing system.

10. The electronic computation device of claim 9, wherein the memory further comprises instructions, that when executed by the processor, cause the electronic computation device to compute the effectiveness metrics based on a level of user correction applied to the plurality of KVPs.

11. The electronic computation device of claim 9, wherein the memory further comprises instructions, that when executed by the processor, cause the electronic computation device to perform an extractor analysis, based on the effectiveness metrics.

12. The electronic computation device of claim 11, wherein the memory further comprises instructions, that when executed by the processor, cause the electronic computation device to compute the extractor analysis utilizing at least one classifier from the group consisting of: Forest Classifier, Support Vector Machine (SVM) classifier, logistic classifier, and gradient boost classifier.

13. The electronic computation device of claim 12, wherein the memory further comprises instructions, that when executed by the processor, cause the electronic computation device to compute the extractor analysis utilizing a gradient boost classifier that includes at least one of XGB classifier, and LightGBM classifier.

14. The electronic computation device of claim 9, wherein the memory further comprises instructions, that when executed by the processor, cause the electronic computation device to:

generate a plurality of extractor combinations; and rank each extractor combination of the plurality of extractor combinations based on the importance metric.

15. The electronic computation device of claim 14, wherein the memory further comprises instructions, that when executed by the processor, cause the electronic computation device to compute the importance metric using at least one of, a confusion matrix, F1 score, Receiver Operator Characteristic curve, and precision-recall curve.

16. The electronic computation device of claim 9, wherein the memory further comprises instructions, that when executed by the processor, cause the electronic computation device to provide a KVP ranking model to the document processing system.

17. A computer program product for an electronic computation device comprising a computer readable storage medium having program instructions embodied therewith, the program instructions executable by a processor to cause the electronic computation device to:

obtain a plurality of key value pairs (KVPs) from a plurality of KVP extractors of a document processing system;

compute a score for the plurality of KVPs by computing an effectiveness metric for each KVP from the plurality of KVPs;

wherein the effectiveness metric factors an importance metric associated with the document processing system;

in response to the computed score being below a predetermined threshold, perform a model retraining process to generate a new set of KVP extractors; and provide the new set of KVP extractors to the document processing system; and dynamically adjust the effectiveness metric based on the retraining via the document processing system.

18. The computer program product of claim 17, wherein the computer readable storage medium further comprises program instructions, that when executed by the processor, cause the electronic computation device to compute the effectiveness metrics are based on a level of user correction applied to the plurality of KVPs.

19. The computer program product of claim 17, wherein the computer readable storage medium further comprises program instructions, that when executed by the processor, cause the electronic computation device to:

generate a plurality of extractor combinations; and rank each extractor combination of the plurality of extractor combinations based on the importance metric.

20. The computer program product of claim 19, wherein the computer readable storage medium further comprises program instructions, that when executed by the processor, cause the electronic computation device to compute the importance metric using at least one function selected from the group consisting of: confusion matrix, F1 score, Receiver Operator Characteristic curve, and precision-recall curve.

\* \* \* \* \*